United States Patent
O'Brien

[11] Patent Number: 6,068,319
[45] Date of Patent: May 30, 2000

[54] SHELVING AND STORAGE SYSTEM FOR A CARGO BOX OF A PICKUP TRUCK

[76] Inventor: Peter O'Brien, 8 Easthill Dr., Doylestown, Pa. 18901

[21] Appl. No.: 08/984,016

[22] Filed: Dec. 3, 1997

[51] Int. Cl.[7] ..................................................... B62D 33/02
[52] U.S. Cl. .......................... 296/37.6; 296/32; 248/243
[58] Field of Search ............................... 296/3, 10, 26.04, 296/32, 36, 37.6; 224/404, 405; 211/117, 208, 211; 248/214, 227.4, 241, 243; 410/89, 143, 144, 145, 150

[56] References Cited

U.S. PATENT DOCUMENTS

| | | |
|---|---|---|
| 4,215,898 | 8/1980 | Ulics . |
| 4,394,100 | 7/1983 | Sperlich .............................. 296/183 X |
| 4,405,170 | 9/1983 | Raya . |
| 4,751,981 | 6/1988 | Mitchell et al. ......................... 182/127 |
| 4,767,149 | 8/1988 | Rye . |
| 4,875,731 | 10/1989 | Ruiz ....................................... 296/37.2 |
| 5,009,457 | 4/1991 | Hall .............................................. 296/3 |
| 5,037,256 | 8/1991 | Schroeder ............................... 410/143 |
| 5,071,185 | 12/1991 | Schiele . |
| 5,118,156 | 6/1992 | Richard . |
| 5,137,320 | 8/1992 | Christensen . |
| 5,139,375 | 8/1992 | Franchuk . |
| 5,560,666 | 10/1996 | Vieira et al. . |
| 5,853,116 | 12/1998 | Schreiner ............................ 296/37.6 X |

*Primary Examiner*—Joseph D. Pape
*Assistant Examiner*—Paul Chenevert

[57] ABSTRACT

An adjustable and versatile shelving system for storing articles in the cargo box of a pickup truck in an efficient manner. Brackets which support load bearing members are adjustably mounted to side rails which are connected to the sidewalls of the cargo box. The connection between the brackets and the side rails enable the height of the shelf above the floor of the cargo box to be adjustable within a range of heights. An additional shelf located a spaced distance above the first shelf can be supported by inverting some of the brackets which are connected to the side rails. The brackets can also be connected to the side rails in a manner which provides a surface for securing vertically-oriented side planks above the cargo box sidewalls to temporarily extend the cargo box sidewalls. A knock down tool chest can be provided on the shelf to store tools in a secure manner, or it can be collapsed to provide extra open shelf storage space.

18 Claims, 5 Drawing Sheets

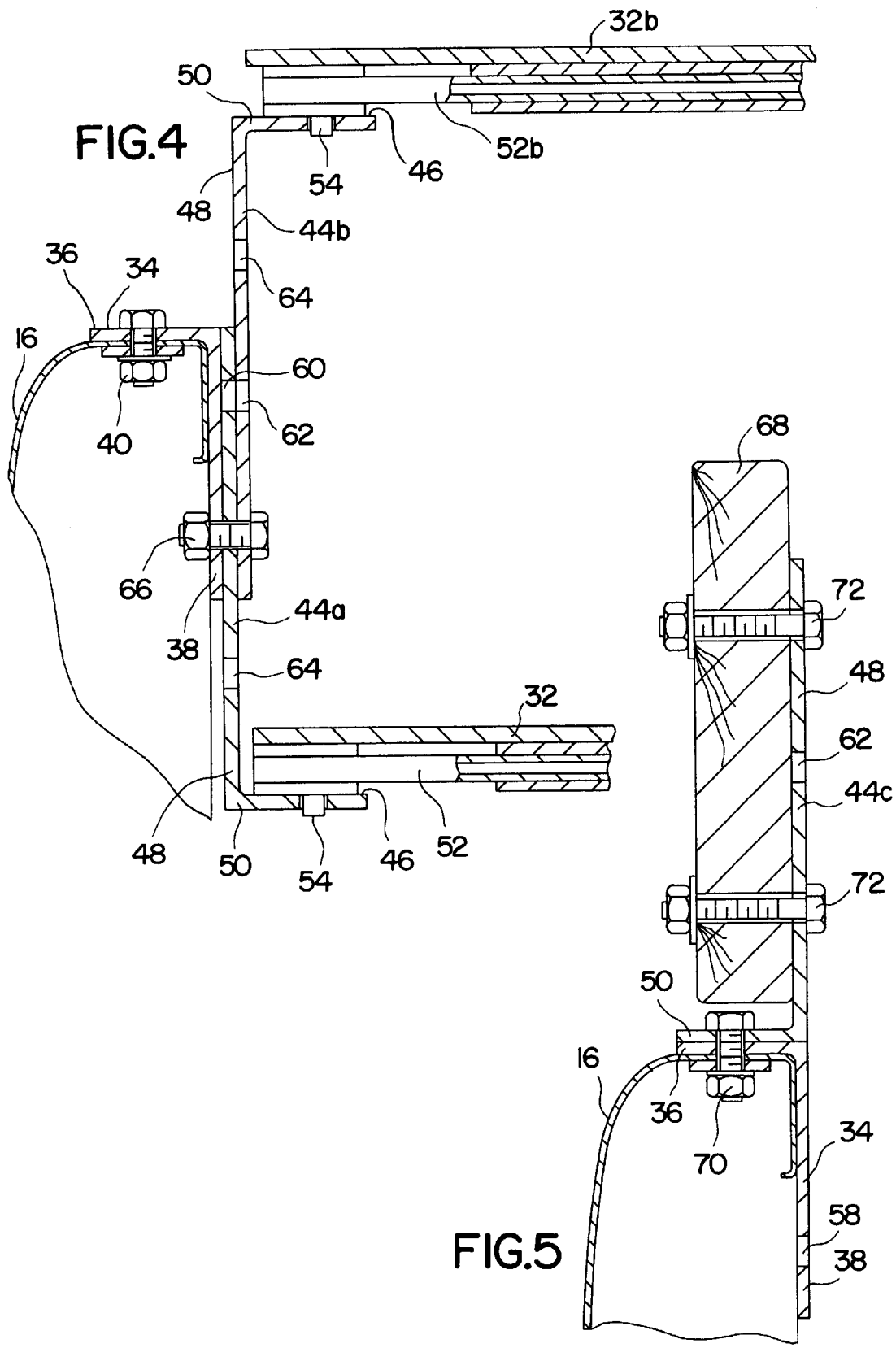

SHELVING AND STORAGE SYSTEM FOR A CARGO BOX OF A PICKUP TRUCK

FIELD OF THE INVENTION

The present invention relates to the efficient storage of various sized articles, such as construction material and tools, in a cargo box of a pickup truck, and more particularly, the present invention relates to a versatile system of shelves which is readily installed in any of a variety of configurations in the cargo box and which is capable of being readily removed or reconfigured.

BACKGROUND OF THE INVENTION

The cargo box of a pickup truck is often utilized to transport various sized articles to a particularly location such as a work site or a home. For instance, bulky construction panels, various sized pieces of wood, tools and the like may all require storage and transportation in a single pickup truck cargo box. Improper storage can result in damage of any of the various material.

One particular problem involving storage and transportation of large construction panels, such as 4×8 wallboard, is that the floors, or beds, of standard sized pickup trucks can not accommodate the panels due to the wheel wells which protrude into the cargo box. This problem has been addressed in a variety of patents, for example, U.S. Pat. No. 5,118,156 issued to Richard, U.S. Pat. No. 4,215,898 issued to Ulics, U.S. Pat. No. 4,394,100 issued to Sperlich, and U.S. Pat. No. 4,767,149 issued to Rye. The Richard patent discloses the use of clamps to support load bearing beams which span the cargo box at an elevation above the wheel wells. The Ulics and Sperlich patents disclose cargo box configurations having channels or recesses for supporting beams or shelves above the wheel wells, and the Rye patent discloses a pickup truck bed liner having recesses for supporting beams above the wheel wells.

Other problems are also experienced in storing and transporting items in the cargo box of a pickup truck, particularly when the type, size and quantity of each item varies from day to day, or project to project. For instance, sometimes the space on the raised shelf needs to be maximized, and sometimes the space under the shelf needs to be maximized. On some occasions more than one type of large panel may be required to be stored on a shelf, and, if only a single shelf is provided, unloading of one type of material may be difficult because it may have other material stacked on it. Sometimes side planks for extending the height of the cargo box sidewalls may be beneficial; while other times the side planks may create unnecessary obstacles. Also, on some occasions, tool boxes, or chests, may provide a secure manner to store and transport tools; while on other occasions the space taken up by the tool chest could be better used in storing large panels.

Although various ones of the above-referenced pickup truck cargo box shelving systems may be satisfactory for their intended purposes, there is a need for an improved storage system which is capable of being assembled in a variety of different configurations to accommodate the given storage requirements provided by a particular haul and which is capable of being readily reconfigured to accommodate different storage requirements provided by other hauls. Such a versatile shelving and storage system should consist of only a few components which are inexpensive to manufacture and which are easy to handle, install and remove.

OBJECTS OF THE INVENTION

With the foregoing in mind, a primary object of the present invention is to provide a novel pickup truck cargo box shelving and storage system which can be readily configured to accommodate storage of a variety of different sized articles in an efficient manner.

Another object of the present invention is to provide an improved pickup truck cargo box shelving and storage system which is capable of providing at least one shelf at a pre-determined elevation above the floor of the cargo box such that the pre-determined elevation is readily adjustable within a range of elevations.

A further object of the present invention is to provide a pickup truck cargo box shelving and storage system which can be configured to include a second horizontal shelf and/or cover and vertical side planks above the cargo box sidewalls.

A still further object of the present invention is to provide a pickup truck cargo box shelving and storage system which includes a removable, or collapsible, tool box which, when in an assembled condition, can be used to securely store tools and which, alternatively, can be configured in a knock down condition so that the full length of the cargo box can be utilized.

A still further object of the present invention is to provide an improved pickup truck cargo box shelving and storage system utilizing only a few uncomplicated components which are inexpensive to manufacture and which are easy to install and remove.

SUMMARY OF THE INVENTION

More specifically, the present invention provides a removable pickup truck cargo box shelving system for use in supporting a load within the cargo box above a floor of the cargo box between opposite sidewalls of the pickup truck. The system includes a pair of elongate side rails which each engage an opposite one of the pickup truck sidewalls, and at least a pair of brackets which each are removably mountable to the side rails. Each of the brackets have a support surface for supporting at least one load bearing support member which extends laterally across the cargo box from one sidewall to the other sidewall and which is supported a given height above the floor of the cargo box. The brackets are adjustably mounted to the side rails so that the height of the load bearing support member above the floor of the cargo box is readily adjustable within a range of heights.

Other aspects of the present invention include providing: a shelf on the load bearing surface; means for providing a second shelf at a different elevation; means for connection of side planks above the sidewalls of the cargo box; and means for providing a collapsible tool chest on the shelf.

BRIEF DESCRIPTION OF THE DRAWINGS

The foregoing and other objects, features and advantages of the present invention should become apparent from the following description when taken in conjunction with the accompanying drawings, in which:

FIG. 4 is a cross-sectional view of a portion of the shelving system supporting a pair of shelves from the sidewall of the cargo box;

FIG. 5 is a cross-sectional view of a side plank mounted above the sidewall of the of the cargo box;

DETAILED DESCRIPTION OF THE PREFERRED EMBODIMENT

Figure 1:
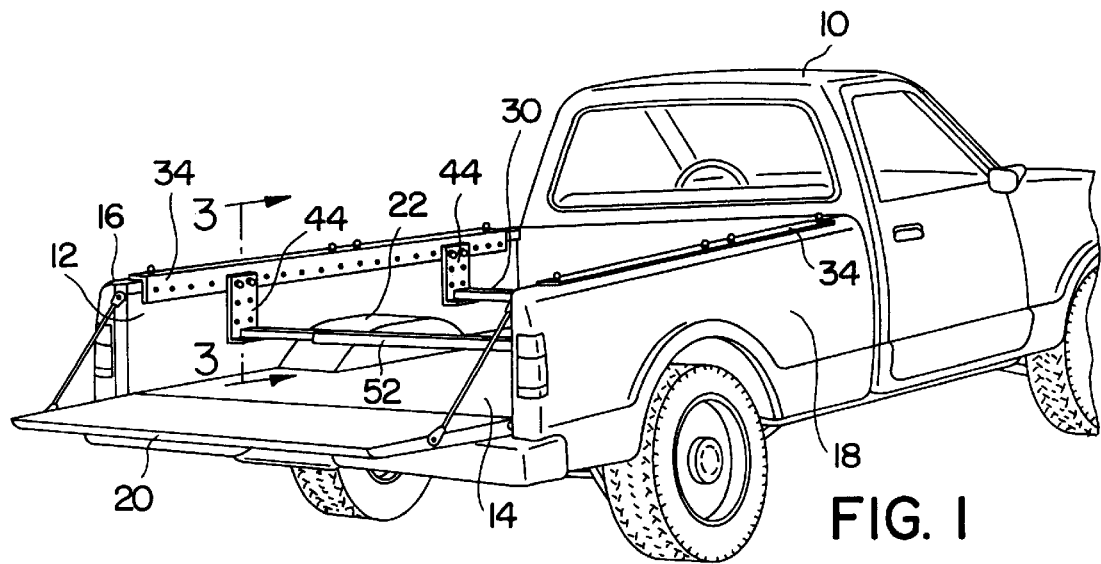
FIG. 1 is a perspective view of an adjustable shelving system embodying the present invention mounted in a cargo box of a pickup truck.
Figure 3:
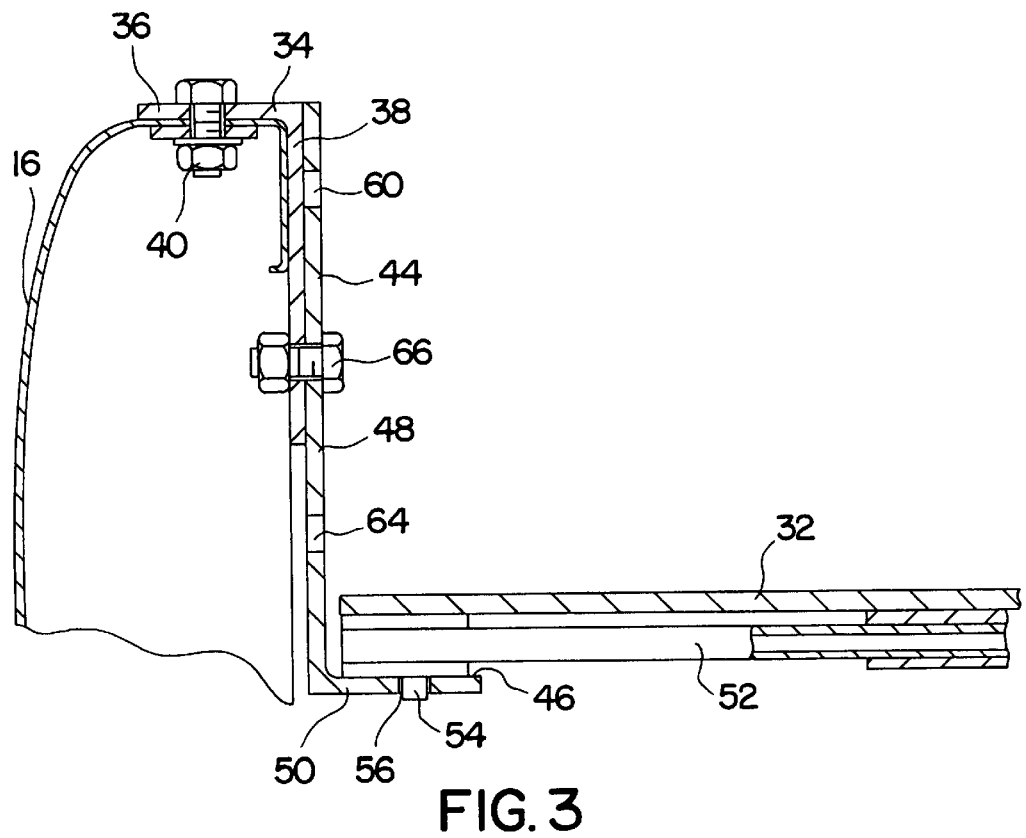
FIG. 3 is a cross-sectional view of a portion of the shelving system mounted to a sidewall of the cargo box, the view taken along line 3—3 of FIG. 1.
Figure 2:
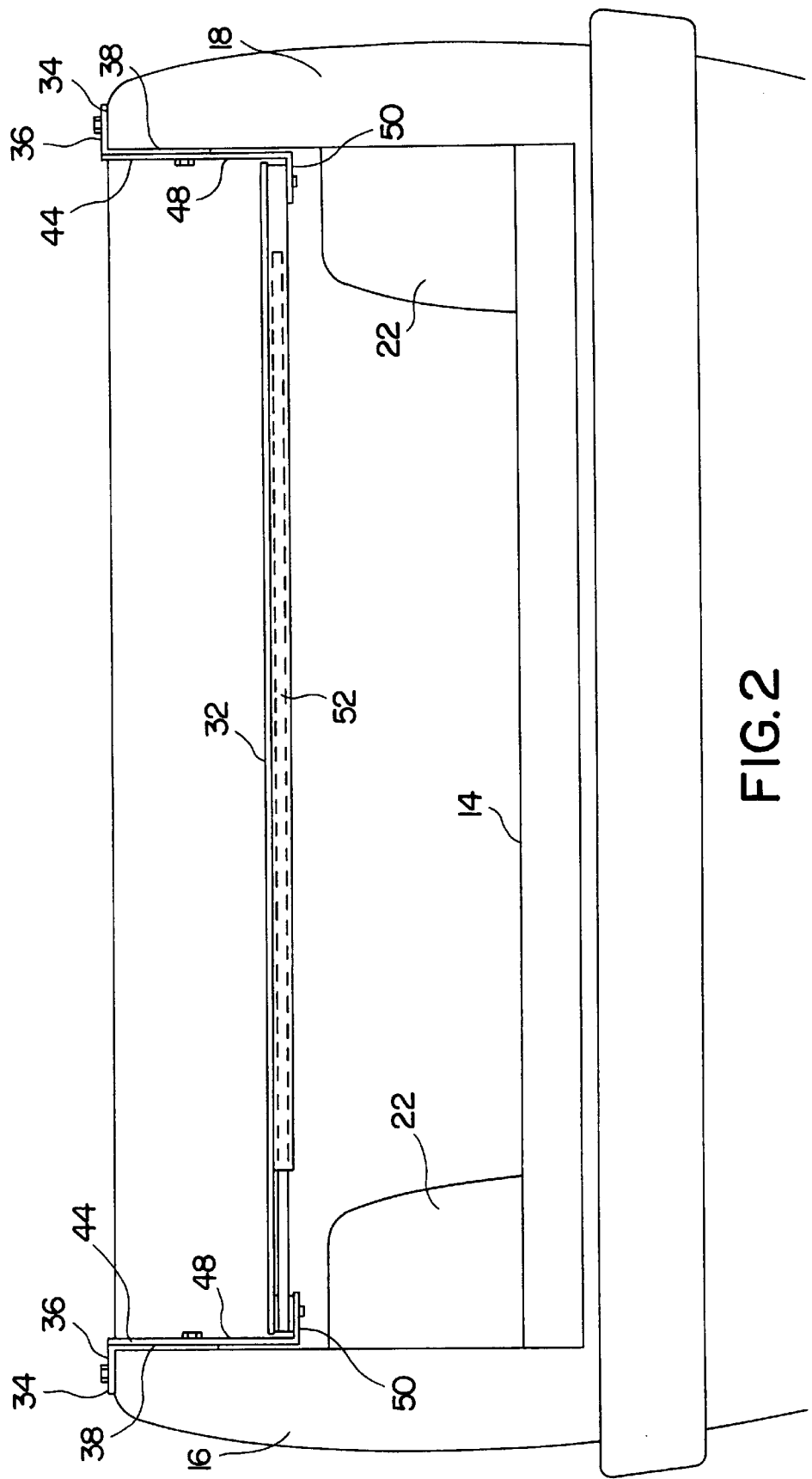
FIG. 2 is a rear elevational view of the shelving system and cargo box illustrated in FIG. 1.
Figure 7:
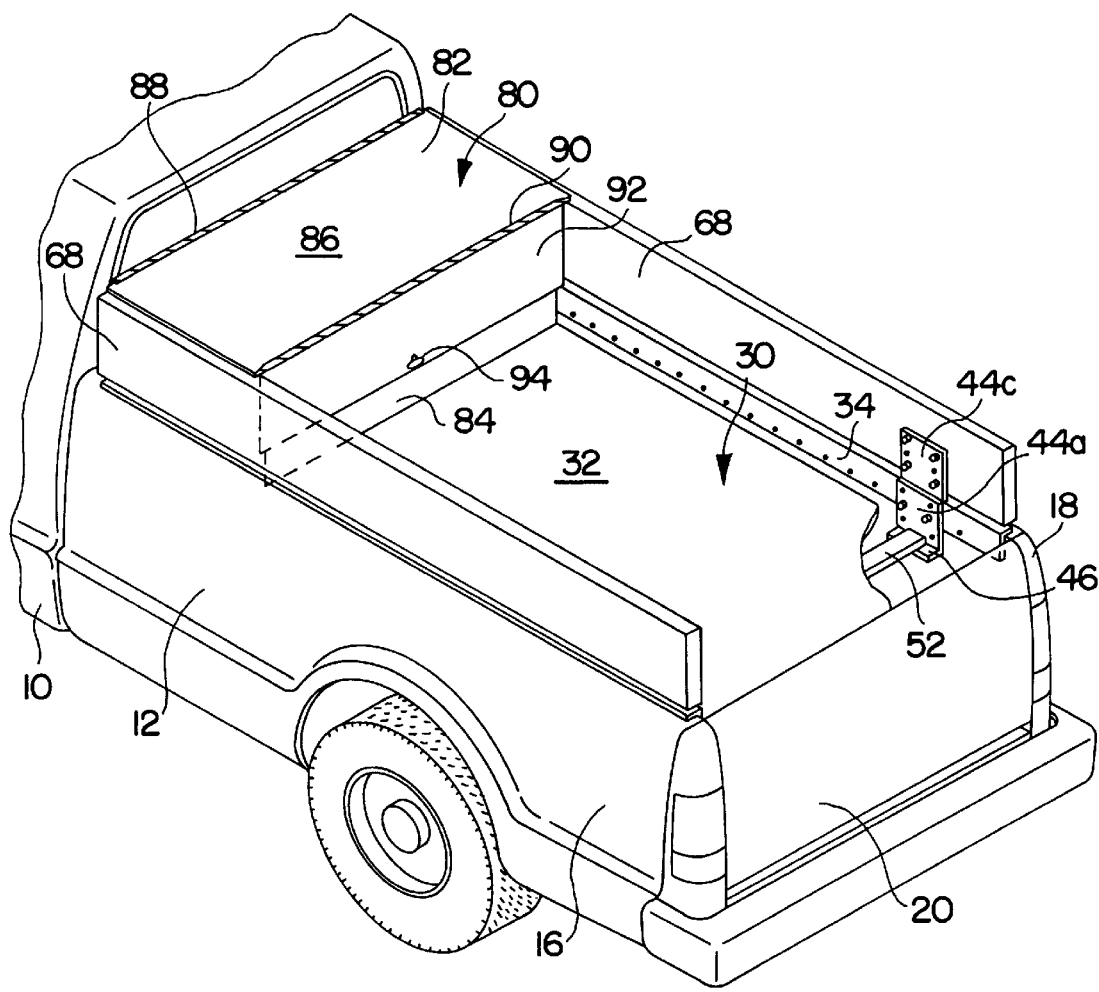
FIG. 7 is a perspective view of a collapsible tool box and shelving system mounted in the cargo box of a pickup truck.

As best illustrated in FIGS. 1 and 7, the present invention is a shelving system 30 with an optional collapsible storage system 80 for use with a pickup truck 10 to provide shelf and storage space. The pickup truck 10 has a cargo box 12 where material, such as large building panels, is placed and hauled. The cargo box 12 has a floor 14, a pair of sidewalls, 16 and 18, extending upwardly from opposite sides of the floor 14, and a tailgate 20 at the rear of the pickup truck 10. Typically, such a pickup truck 10 also has a pair of wheel wells 22 which extend upwardly from the floor 14 of the cargo box 12 and which tend to interfere with the stacking of large panels in the cargo box 12. Thus, the shelving system 30 provides a shelf, or shelves, 32 a spaced distance above the floor 14 of the cargo box 12 so that large panels or other large items can be horizontally-disposed within the cargo box 12 without interference from the wheel wells 22.

Figure 6:
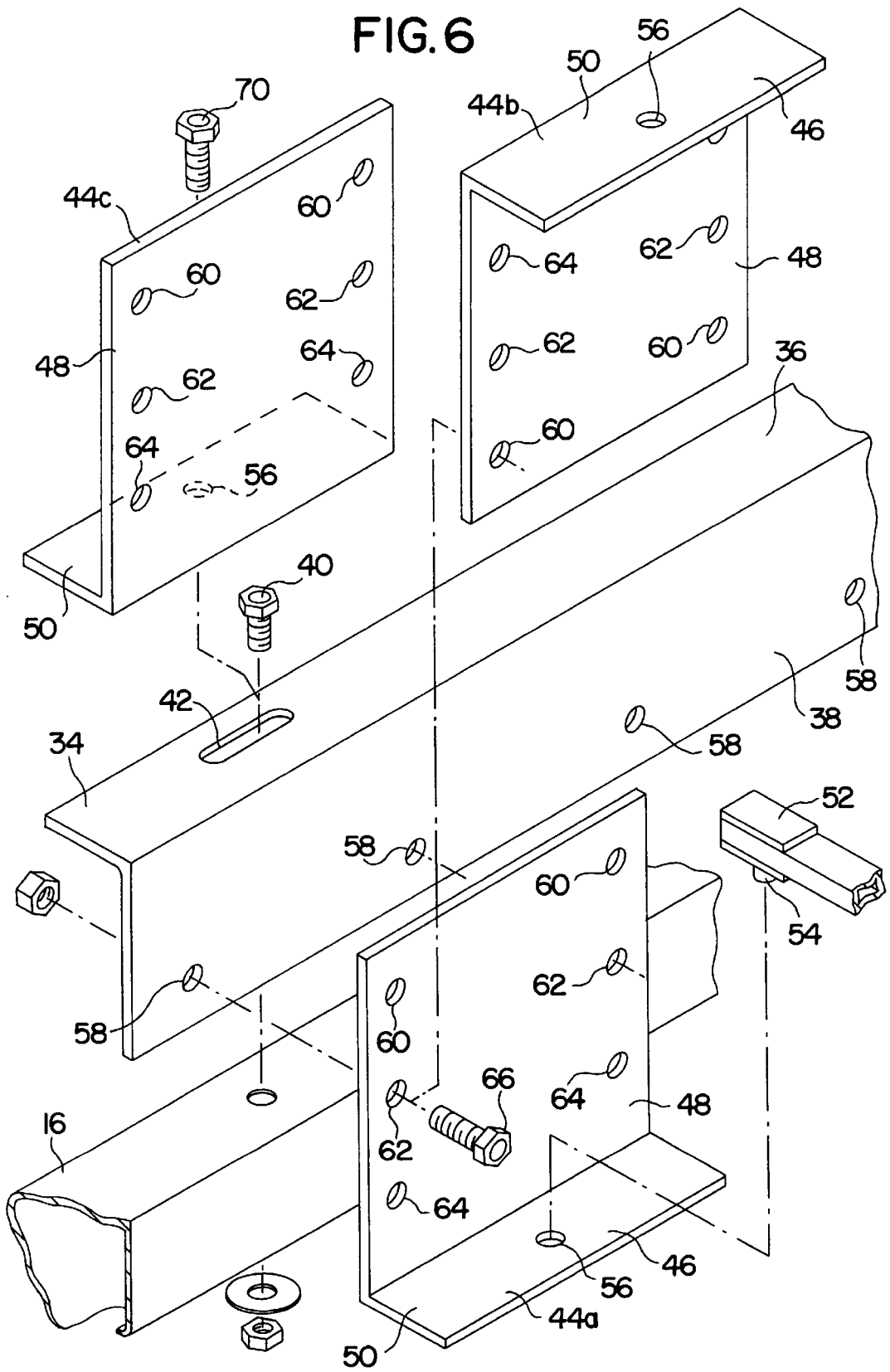
FIG. 6 is an exploded perspective view of a portion of the shelving system.

The shelving system 30 according to the present invention utilizes at least a pair of side rails 34 to connect the shelving system 30 to the cargo box 12. As illustrated, at least one side rail 34 attaches to each of the sidewalls, 16 and 18, of the cargo box 12. To this end, each side rail 34 has a horizontally-disposed first elongate flange 36 and an integral vertically-disposed second elongate flange 38 extending downwardly from the flange 36 into the cargo box 12. Each flange 36 confronts and is fastened to the top of one of the sidewalls, 16 or 18, of the cargo box 12. As best illustrated in FIG. 6, the connection between the flange 36 and the cargo box sidewall, 16 or 18, is made with a nut and bolt 40 via an aperture 42 in the flange 36. As shown in FIG. 1, the length of the side rails 34 can extend the entire length of the cargo box 12; or alternatively, the side rails 34 can be cut to a shorter length to suit a particular need.

The side rails 34 are utilized to mount brackets 44 which provide support surfaces 46 above the floor 14 of the cargo box 12. To this end, each bracket 44 is L-shaped having a vertical leg portion 48 which mounts to one of the flanges 38 of the side rails 34 and a horizontal leg portion 50 which forms the support surface 46. Thus, by mounting brackets 44 in an opposed relation anywhere along the length of the side rails 34, a support member 52 can be supported on the pair of opposed brackets 44 such that the support member 52 spans the cargo box 12. Preferably, as illustrated, the support member 52 is telescopically expandable so that it fits different sized cargo boxes, and the support member 52 has a projection 54 which cooperatively mates with an aperture 56 in the support surface 46 to lock the support member 52 in position. After at least two support members 52 are set in place, a shelf 32 can be supported thereon.

A novel aspect of the present invention is that the height of the shelf, or shelves 32 above the floor 14 of the cargo box 12 is readily adjustable within a range of heights. The adjustment is accomplished by the connection of the side rails 34 to the brackets 44. As best illustrated in FIG. 6, the vertically-disposed side rail flange 38 has a series of apertures 58 which can be aligned with any one of a series of apertures 60, 62 and 64 in the vertical leg portion 48 of the bracket 44 to fasten the bracket 44 to the side rail 34. The series of apertures 60, 62, and 64 are spaced varying distances from the horizontal leg portion 50 so that the height of the shelf 32 above the floor 14 is determined by which of the series of apertures 60, 62, or 64 is utilized to make the connection with the side rail 34. For instance, referring to bracket 44a of FIG. 6, if apertures 60 are utilized, the support surface 46 will be relatively closer to the floor 14 than if apertures 62, or 64, are utilized, and if apertures 64 are utilized, the support surface 46 will be further above the floor 14 than if apertures 60, or 62, are utilized. As illustrated, the connection is made with a nut and bolt 66.

Another unique concept of the present invention is that the brackets 44 can be alternatively mounted to the side rails 34 in an inverted position. For instance, the vertical leg portion 48 of the bracket 44 can be mounted to the side rail 34 such that the horizontal leg portion 50 of the bracket 44 is above the vertical leg portion 48. Thus, the support surface 46 can be located even a greater distance above the floor 14, and this greater distance is further adjustable by selection of the appropriate apertures 60, 62, or 64 to make the connection to the flange 38 of the side rail 34. For example, as illustrated in FIG. 4, the bracket 44b is mounted to the side rail 34 in an inverted position and supports a support member 52b and a shelf 32b. The shelf 32b can be used alone without other shelves, as a second shelf above a lower shelf, or as a cargo box cover, or lid.

The same invertible bracket 44 which provides the support surface 46 for shelves can provide a means of attaching side planks 68 directly above the sidewalls, 16 and 18, of the cargo box 12 to extend the sidewalls. As best illustrated in FIG. 5, a nut and bolt 70 fastens the horizontal leg portion 50 of the bracket 44c to the flange 36 of the side rail 34 via the aperture 56 on the bracket 44c and aperture 42 on the side rail 34. The side plank 68 is connected to the vertical leg portions 48 of the bracket 44c by nut and bolts 72 via apertures 60 and 64 in the bracket 44c.

The storage system 80 according to the present invention is provided by a collapsible tool box 82 located in the cargo box 12. To this end, the tool box 82 has an open bottom and utilizes the shelf 32 of the shelving system 30 as a base. The front wall 84 of the tool box 82 is completely removable from the remaining walls of the tool box 82 so that when more shelf space is required, the tool box 82 can be readily disassembled. The tool box 82 includes a rear wall (not shown) spaced from and parallel to the front wall 84 and a pair of parallel tool box sidewalls (not shown) extending between the front and rear walls to form a substantially rectangular tool box 82. A lid 86 is connected to the tool box rear wall by a hinge 88 and has of a second hinge 90 permitting a portion 92 of the lid 86 to overhang the front wall 84. A lockable latch 94 is utilized to lock the lid 86 in a closed position. If at any time the tool box 82 is not required, it can be collapsed by backwardly pivoting the lid 86 and removing the front wall 84. The front wall 84, for example, can be retained in position by being slidably received within opposed grooves (not shown) located on the front edges of the tool box sidewalls.

By way of example, and not by way of limitation, the series of apertures 60, 62, and 64 on the vertical leg portion 48 of the brackets 44 are spaced 3 inches, 6 inches, and 9 inches, respectively, from the horizontal leg portion 50. Alternatively, any combination of other spaced series of apertures could be utilized, or the series of apertures could be located on the side rail instead of the bracket. In addition, although nut and bolts communicating via apertures were illustrated for most connections, other means for fastening various components together can be utilized.

In view of the foregoing, it should be readily apparent that the present invention provides a fully adjustable and versatile shelving and storage system for use with a pickup truck. A single bracket component can be mounted to a side rail in a variety of manners for a variety of purposes. The height of the support surface above the floor of the cargo box is readily adjustable and more than one shelf can be utilized Side planks can be installed to extend the height of the sidewalls of the cargo box, and a tool box can be utilized or collapsed to permit efficient use of the full length of the cargo box.

While a preferred shelving system and storage system have been described in detail, various modifications, alterations, and changes may be made without departing from the spirit and scope of the present invention as defined in the appended claims.

What is claimed is:

1. A removable pickup truck cargo box shelving system for use in supporting a load within the cargo box above a floor of the cargo box between opposite sidewalls of the pickup truck, comprising:

a pair of elongate side rails each engaging an opposite one of the pickup truck sidewalls;

at least a pair of brackets each being removably mountable to said side rails and each having a support surface; and at least one load bearing support member adapted to extend laterally across the cargo box from one sidewall to the other sidewall and to be supported a given height above the floor of the cargo box by said support surfaces of at least two of said brackets;

said brackets being adjustably mounted to said side rails so that said height of said load bearing support member above the floor of the cargo box is readily adjustable;

each of said brackets having a vertical leg portion which is capable of being adjustably mounted to one of said side rails and a horizontal leg portion which forms said support surface; and each of said side rails having a first elongate flange which engages and is mounted to a top surface of the sidewall of the pickup truck and a second elongate flange extending downwardly into the cargo box from said first elongate flange, and each of said second elongate flanges being capable of being adjustably attached to said vertical leg portions of said brackets.

2. A removable pickup truck cargo box shelving system according to claim 1, wherein each of said vertical leg portions are mounted to one of said side rails with fasteners which extend through a set of cooperating mounting holes located on each of said vertical leg portions and said side rails.

3. A removable pickup truck cargo box shelving system according to claim 2, wherein each of said vertical leg portions have mounting holes at different spaced distances from said horizontal leg portion so that by inserting said fastener through an appropriate one of said mounting holes on said vertical leg portion of said bracket said height of said support surface above the floor of the cargo box is readily adjustable.

4. A removable pickup truck cargo box shelving system according to claim 1, wherein said L-shaped brackets are capable of being mounted to said side rails such that said horizontal leg portions of said L-shaped brackets extend below said vertical leg portions.

5. A removable pickup truck cargo box shelving system according to claim 1, wherein said L-shaped brackets are capable of being mounted in an inverted position such that said horizontal leg portions of said inverted L-shaped brackets extend above said vertical leg portions.

6. A removable pickup truck cargo box shelving system according to claim 1, wherein each of said L-shaped brackets are capable of being mounted in a non-inverted position such that said horizontal leg portion of said L-shaped bracket extends below said vertical leg portion; and wherein each of said L-shaped brackets are also capable of being mounted in an inverted position such that said horizontal leg portion of said inverted L-shaped bracket extends above said vertical leg portion.

7. A removable pickup truck cargo box shelving system according to claim 6, wherein each of said side rails is capable being mounted with said L-shaped brackets in both said inverted position and said non-inverted position so that multiple shelves are capable of being created at different heights from the floor of the cargo box.

8. A removable pickup truck cargo box shelving system according to claim 1, wherein said horizontal leg portion of said L-shaped brackets are also capable of being mounted to a top surface of said first elongate flange of said side rails to provide a means for attaching vertically-oriented sidewall planks above the pickup truck sidewalls to increase the height of the sidewalls of the cargo box.

9. A removable pickup truck cargo box shelving system according to claim 1, further comprising a horizontally-oriented plank forming a shelf which is located on and supported by said load bearing members; and further comprising an open-bottomed tool box which extends over a portion of said shelf from one of the pickup truck sidewalls to the other sidewall, said portion of said shelf forming a bottom wall of said tool box.

10. A removable pickup truck cargo box shelving system according to claim 9, wherein said tool box has a front wall, a rear wall, and a pair of sidewalls extending between said front and rear walls, and said tool box has a hinged lid capable of closing and locking closed said tool box.

11. A removable pickup truck cargo box shelving system according to claim 10, wherein said front wall of said tool box is removable so that said shelf can be used entirely if said tool box is not required.

12. A removable pickup truck cargo box shelving system for use in supporting a load within the cargo box above a floor of the cargo box between opposite sidewalls of the pickup truck, comprising:

a pair of elongate side rails each engaging an opposite one of the pickup truck sidewalls, each of said side rails having a first elongate flange which engages and is mounted to a top surface of the sidewall of the pickup truck, and each of said side rails having a second elongate flange extending downwardly into the cargo box from said first elongate flange;

a plurality of L-shaped brackets each having a vertical leg portion capable of being mounted to said second elongate flange of one of said side rails and each having a horizontal leg portion which forms a support surface;

at least one load bearing support member extending laterally across the cargo box from one sidewall to the other sidewall and being supported a given height above the floor of the cargo box by said support surfaces of at least two of said brackets;

said brackets being adjustably mounted to said side rails so that said height of said load bearing support member above the floor of the cargo box is readily adjustable.

13. A removable pickup truck cargo box shelving system according to claim 12, wherein said vertical leg portions of said brackets and said second elongate flanges of said side rails have cooperating mounting holes which when aligned permit said bracket to be mounted to said side rails with a fastener.

14. A removable pickup truck cargo box shelving system according to claim 13, wherein one of said vertical leg portions and said side rails have a series of mounting holes at spaced elevation locations so that the height of said support surfaces above the floor of the cargo box is determined by which mounting hole said fastener is received.

15. A removable pickup truck cargo box shelving system according to claim 14, wherein each of said L-shaped brackets are capable of being mounted to said second elongate flange of said side rails in a non-inverted position such that said horizontal leg portion of said L-shaped bracket extends below said vertical leg portion and in an inverted position such that said horizontal leg portion of said inverted L-shaped bracket extends above said vertical leg portion.

16. A removable pickup truck cargo box shelving system according to claim 15, wherein said horizontal leg portion of said L-shaped brackets are also adapted to be mountable to a top surface of said first elongate flange of said side rails to provide a means for attaching vertically-oriented sidewall planks above the pickup truck sidewalls to increase the height of the sidewalls of the cargo box.

17. A removable pickup truck cargo box shelving system for use in supporting a load within the cargo box above a floor of the cargo box between opposite sidewalls of the pickup truck, comprising:

a pair of elongate side rails each engaging an opposite one of the pickup truck sidewalls, each of said side rails having a first elongate flange which engages and is mounted to a top surface of the sidewall of the pickup truck, and each of said side rails having a second elongate flange extending downwardly into the cargo box from said first elongate flange;

a plurality of L-shaped brackets each having a vertical leg portion capable of being adjustably mounted to said second elongate flange of one of said side rails and each having a horizontal leg portion which forms a support surface;

at least one load bearing support member extending laterally across the cargo box from one sidewall to the other sidewall and being supported a given height above the floor of the cargo box by said support surfaces of at least two of said brackets;

a horizontally-oriented plank forming a shelf which is located on and supported by said load bearing members; and a collapsible open-bottomed tool box extending over a portion of said shelf from one of the pickup truck sidewalls to the other sidewall, said portion of said shelf forming a bottom wall of said tool box.

18. A removable pickup truck cargo box shelving system according to claim 17, wherein said tool box has a front wall, a rear wall, a pair of sidewalls extending between said front and rear walls, and a lid connected to said rear wall with a hinge and capable of being locked to said front wall; and wherein said front wall of said tool box is removable so that said shelf is entirely useable when said tool box is not required.

* * * * *